United States Patent [19]

Baudermann

[11] Patent Number: 5,209,145
[45] Date of Patent: May 11, 1993

[54] SPHERICAL BORING TOOL

[75] Inventor: Adolf Baudermann, Nuertingen, Fed. Rep. of Germany

[73] Assignee: Cross Europa-Werk GmbH, Wendlingen, Fed. Rep. of Germany

[21] Appl. No.: 831,693

[22] Filed: Feb. 5, 1992

[30] Foreign Application Priority Data

Feb. 14, 1991 [DE] Fed. Rep. of Germany ....... 4104474

[51] Int. Cl.$^5$ .............................................. B23B 5/40
[52] U.S. Cl. ....................................... 82/1.5; 408/159; 408/180
[58] Field of Search ...................... 82/1.2, 1.3, 1.4, 1.5; 408/180, 159

[56] References Cited

U.S. PATENT DOCUMENTS

| 2,305,812 | 12/1942 | Regul | 82/1.5 |
| 4,945,792 | 8/1990 | Gardner | 82/1.5 X |
| 4,979,852 | 12/1990 | Noggle | 82/1.5 X |

FOREIGN PATENT DOCUMENTS 3042400  5/1981  Fed. Rep. of Germany ......... 82/1.5

*Primary Examiner*—Z. R. Bilinsky
*Attorney, Agent, or Firm*—John R. Benefiel

[57] ABSTRACT

A tool is described for boring spherically curved inner surfaces consisting of a main body which rotates about its longitudinal axis during the boring operation. A swivel housing is mounted on an axle bolt in the main body and can thus be swiveled about an axis at right angles to the longitudinal axis. The swivel motion is produced with the aid of a linkage arrangement provided in the tool. A cutting tool holder is guided for longitudinal displacement in the swivel housing at right angles to the axle bolt. The cutting tool holder is supported lateral wedge surfaces on a mating wedge surface of the axle bolt and extends with a shank part through the axle bolt. With the aid of a compression spring and an adjusting screw, the axle bolt can be displaced in the longitudinal direction relative to the cutting tool holder to adjust the radial spacing of the cutter from the axle bolt by the mating wedge surface.

21 Claims, 5 Drawing Sheets

SPHERICAL BORING TOOL

BACKGROUND OF THE INVENTION

The invention relates to a device for boring spherically curved workpiece inner surfaces.

Such a device is known from German published patent application 30 42 400. This comprises a main body having a slit-shaped through-opening in which a swivel housing is mounted for swivel motion on a tubular axle. The tubular axle lies at a right angle to the axis of rotation of the boring device in order that the cutting tool attached to the swivel housing can move over the entire spherical surface to be machined during rotation of the boring tool. A wedge gearing is provided to enable compensation of cutter tolerances so that the same workpiece internal diameter will be produced. This wedge gearing comprises a wedge longitudinally displaceable in the tubular axle with a ram displaceable at right angles to the axle resting against the wedge. The ram constitutes the connecting member between the wedge and the cutting tool holder which is firmly screwed to the outside of the swivel housing and has a resilient arm on which the actual cutting tool is mounted. By displacing the wedge in the axle, the ram is pushed more or less radially outwardly in order to adjust the trajectory diameter of the cutting tool relative to the axle.

Actuation of the wedge is carried out by a further wedge gearing which is connected to an actuating rod extending through the shank of the boring tool. Since the actuating rod for swiveling the swivel housing extends through the shank of the boring tool in addition to this actuating rod, the known boring tool cannot be readily decoupled from the work spindle. Therefore, it is not suitable for machine tools in which tool changing takes place.

The possibility of the known boring tool to carry out cutter adjustment by an actuating rod inside the tool spindle no longer constitutes an advantage in today's transfer lines To measure the cutter position, the tool has to be brought into a defined rotary position anyway.

A further limitation results from the spring mounting of the arm carrying the actual cutting tool. The stiffness of the spring joint must represent a compromise. To provide as strong a mounting as possible for the cutting tool, the spring joint should be as stiff as possible However, problems then arise with the adjustment for excessively large forces are required for this. For this reason, the designer makes the spring joint only so strong that it is capable of withstanding the forces occurring during the normal cutting operation.

In the case of cutter breakage, the cutting tool holder may become damaged and have to be exchanged. This not only means that the machine is out of action for a certain time, but also involves considerable costs for a new cutting tool holder which has a relatively complicated shape and is correspondingly expensive to manufacture.

Proceeding from this, the object of the invention is to provide a device for boring spherically curved workpiece inner surfaces which is of simple and robust design and is easily exchangeable.

SUMMARY OF THE INVENTION

This object is accomplished in accordance with the invention by forming the axle bolt itself with a wedge surface which acts to enable a tool adjustment when the axle bolt is shifted longitudinally by an adjustment.

The arrangement of the wedge surface on the axle bolt enables a separate part to be dispensed with and also permits the wedge surface to be made larger and so greater forces can be transmitted. Since the axle bolt on which the wedge surface is arranged naturally has a larger diameter than the wedge pin which in the known devices is mounted inside the axle bolt, a larger adjustment stroke is also possible. Furthermore, the number of necessary parts is thereby reduced.

To make the configuration particularly space saving, the actuating device for displacing the axle bolt carrying the wedge surface is accommodated in the axle bolt itself.

In cooperation with the cutting forces, the wedge surface provided on the axle bolt does, in itself, prevent the axle bolt from turning in the swivel housing anyway. However, in order to increase the accuracy, it may prove advantageous to provide additional means for preventing it from turning, which, apart from that, has the advantage that the axle bolt remains in the correct position even when no cutting forces occur. The means for preventing the axle bolt from turning consists, in the simplest case, in the cutting tool holder itself, for which purpose the axle bolt has a through-opening which extends at a right angle to its longitudinal axis and through which a shank part of the cutting tool holder is guided.

A particularly robust cutting tool holder is obtained by it being designed in the fashion of a plunger piston and being seated in a bore of the swivel housing. In this way, on the one hand, it is capable of receiving very high reaction forces. Even if damage should occur as a result of cutter breakage, for example, because the pocket for holding the cutting plate insert is crushed, the cutting tool holder can be easily exchanged. It also has a relatively simple shape and does not have to consist of a material with resilient properties. Also the shoulder areas of the cutting tool holder which cooperate with the wedge surface on the axle bolt can be manufactured in a simple way.

If the through-opening in the axle bolt is in the form of an elongate hole and the shank part of the cutting tool holder is likewise of flat-edged configuration in the region of this through-opening, this provides in a simple way a means for preventing the cutting tool holder from executing a rotary motion. In this case, the moments about the longitudinal axis of the cutting tool holder can be kept particularly small if the cutter lies on the longitudinal axis.

The tilting moment acting on the cutting tool holder as a result of the cutting force is absorbed in the simplest way with the aid of a round pin which is formed on the cutting tool holder and is guided for longitudinal displacement in a matching cylindrical bore of the swivel housing.

The cutting tool holder becomes particularly simple if, with the exception of the shank part extending through the axle bolt, it is otherwise of cylindrical design, possibly with the different diameters.

DESCRIPTION OF THE DRAWINGS

An embodiment of the subject matter of the invention is illustrated in the drawings.

DETAILED DESCRIPTION

Figure 1:
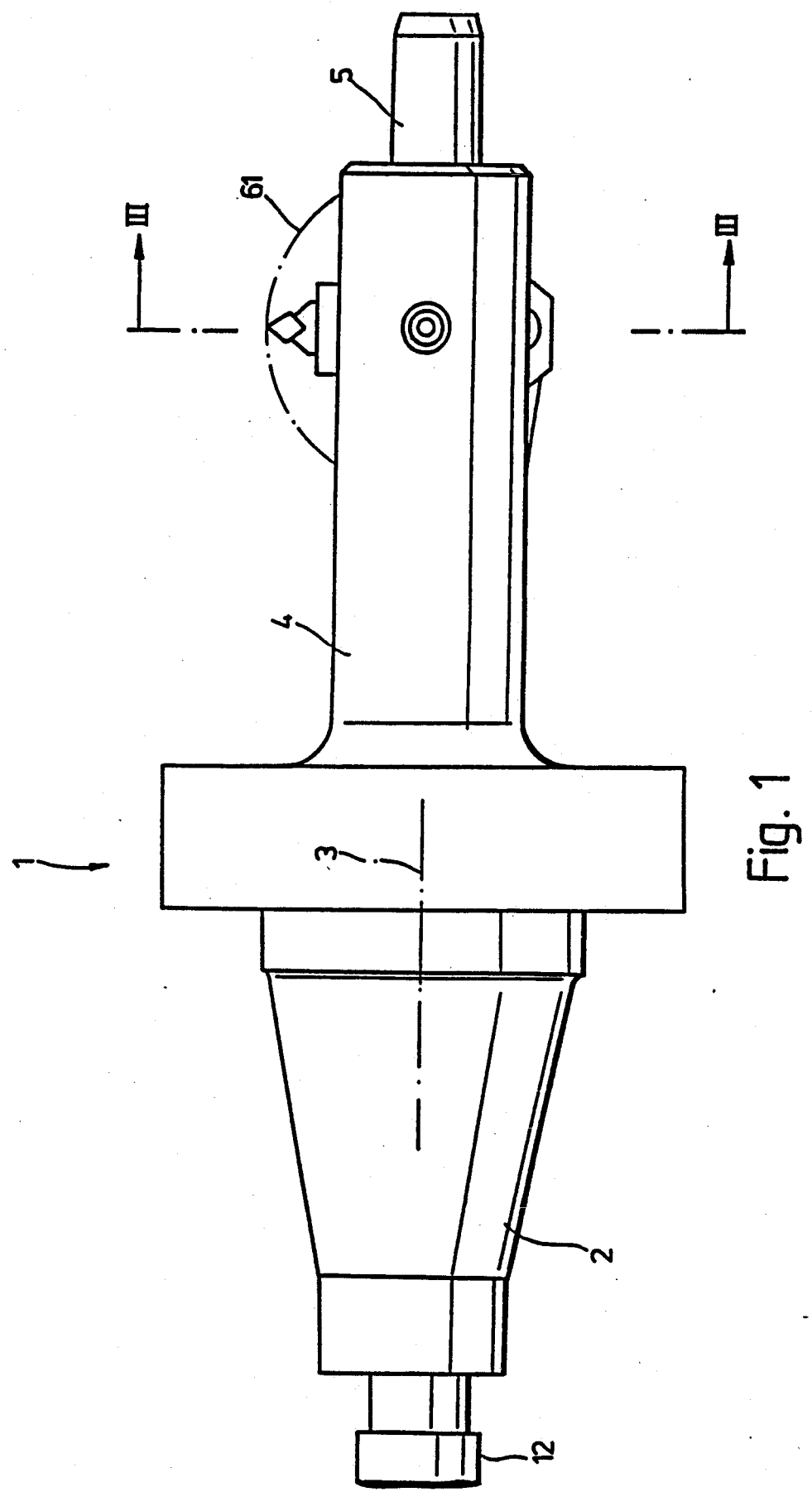
FIG. 1 is a side view of a device for boring spherical inner surfaces on workpieces.

FIG. 1 shows in a side view a device 1 for boring out or turning out spherical inner surfaces on workpieces. For this purpose, the device 1 is received with its conical end 2 arranged on the rear side thereof in a machine tool spindle and set in rotary motion relative to its longitudinal axis or axis of rotation 3. Its front end facing the workpiece forms a cylindrical main body 4 which is concentric with the axis of rotation 3 and terminates in a cylindrical pin 5 which during the boring operation is inserted in an abutment stationary in the machine tool in order to additionally absorb transverse forces. In the proximity of the cylindrical pin 5, a continuous slot 6 (FIG. 2) extends transversely to the axis of rotation 3 in the main body 4 and a swivel housing 7 is mounted therein for swivel motion on an axle bolt 8. The axle bolt 8 is seated in a bore 10 of the swivel housing 7 which has the shape of a hexagonal plate. The longitudinal axis of the bolt 8 intersects the axis of rotation 3 at a right angle.

The main body 4 is provided with a continuous longitudinal bore 9 extending as far as the receiving slot 6. Guided for longitudinal displacement in the longitudinal bore 9 is an actuating rod 11, the rear end of which protrudes from the device 1 at 12. The actuating rod 11 is forked at its front end 13 adjacent the swivel housing 7 and provided with a transverse bore in which a bearing bolt 14 is inserted. Mounted on the bearing bolt 14 for swivel motion at one end is a connecting rod 15 which is connected for swivel motion at the other end to the swivel housing 7. For this purpose, the swivel housing 7 is provided with a slot 16 on its appropriate side, which likewise produces a fork in which the connecting rod 15 is arranged with its other end. Extending transversely through the swivel housing 7 in the region of the slot 16 is a bearing bolt 17 which also extends through a corresponding bore in the connecting rod 15 so the connecting rod 15 is articulated on the swivel housing 7 via the bolt 17.

When the actuating rod 11 which is coaxial with the axis of rotation is displaced in the longitudinal direction in the main body 4, it produces with the aid of the connecting rod 15 a rotary motion of the swivel housing 7 about the axis of the axle bolt 8.

The axle bolt 8 is inserted at both ends in a through-bore 18 which extends through the main body 4 in the region of the receiving slot 6 at a right angle to the latter. The axis of the through-bore 18 intersects the axis of rotation 3 at a right angle and hence stands perpendicular on the side walls of the receiving slot 6. The axle bolt 8 is guided for both rotation and longitudinal displacement in a play-free manner in the through-bore 18.

Figure 3:
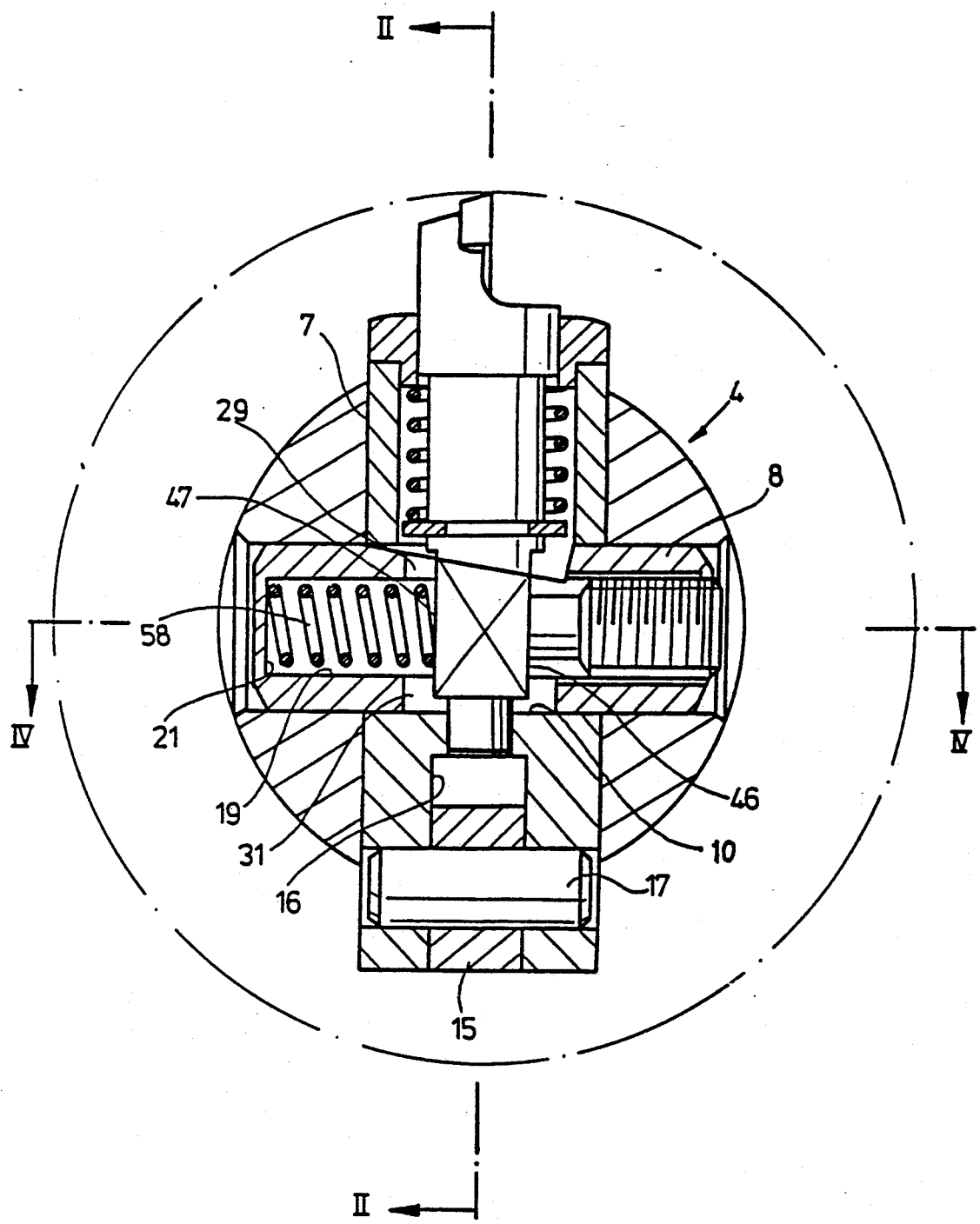
FIG. 3 is a cross-section of the device from FIG. 1 taken along line III—III of FIG. 1.
Figure 4:
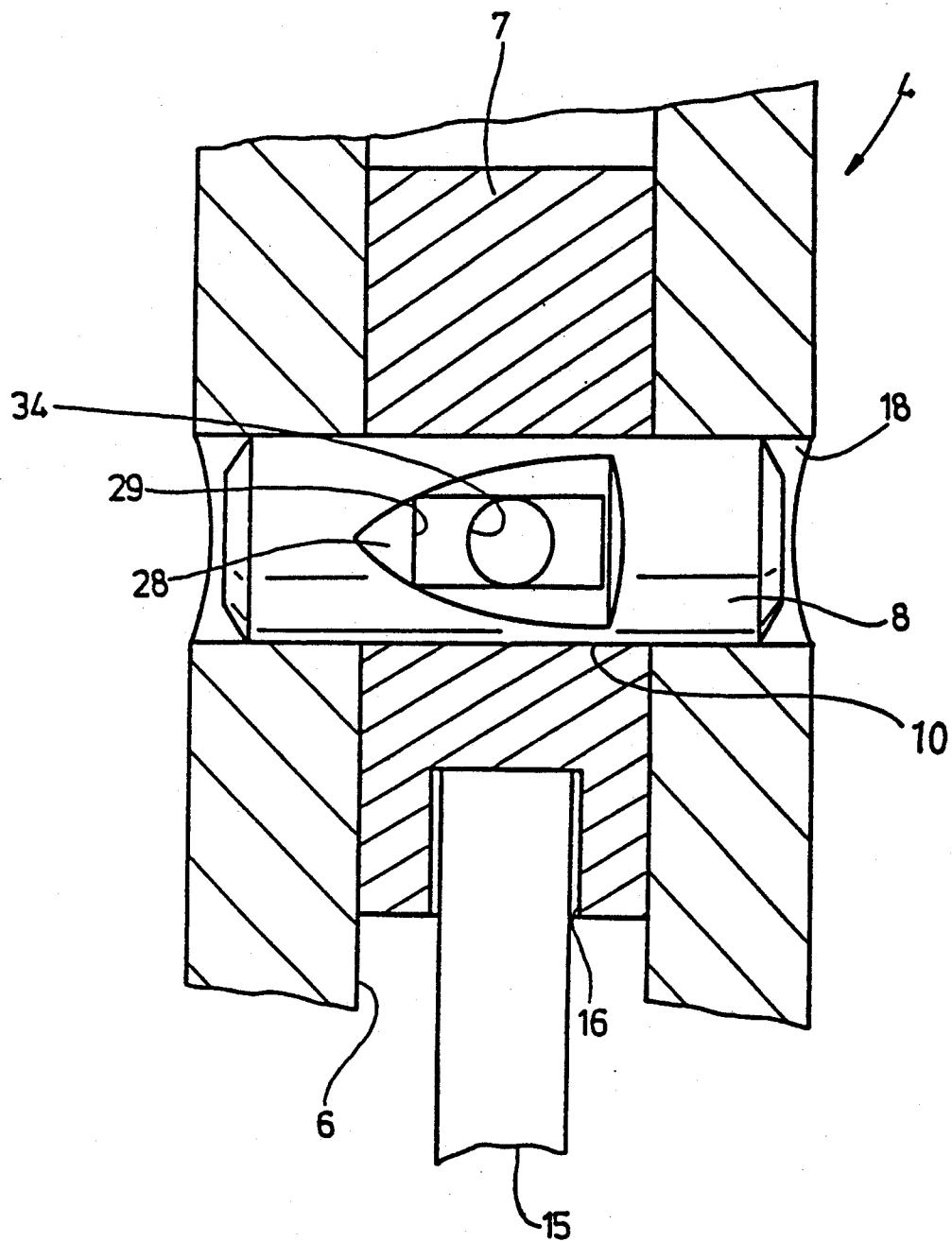
FIG. 4 is a section of the device according to FIG. 1 taken along line IV—IV of FIG. 3, without cutting tool holder.
Figure 5:
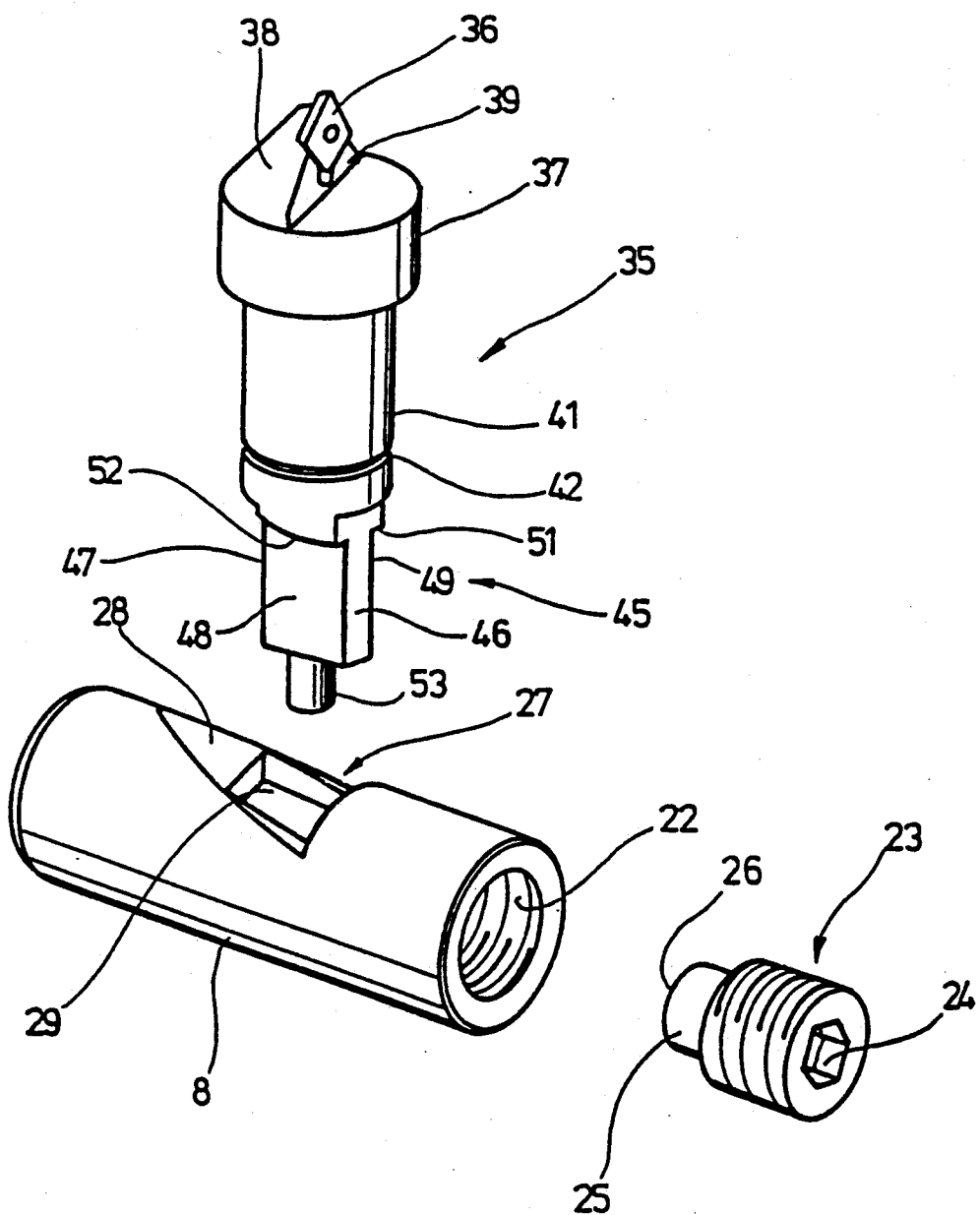
FIG. 5 is a perspective, exploded illustration of the axle bolt, the cutting tool holder and the adjustment screw of the device according to FIG. 1.

Its design is best recognizable from FIGS. 3 and 5. The axle bolt 8 is a cylindrical bolt with a diameter which is constant throughout its length. It contains a blind bore 19 which is concentric with its cylindrical outer surface and terminates bluntly at a bottom 21. At the other end, the blind bore 19 is provided with an internal thread 22 into which an adjusting screw 23 can be screwed. The adjusting screw 23 is a set screw having at one end thereof a hexagon socket 24 for insertion of a corresponding tool and at the other end thereof a cylindrical pin 25 with a flat end face.

The axle bolt 8 carries in its circumferential surface a cut-out section 27 in the fashion of an organ pipe. A surface 28 extending at an inclined to the longitudinal axis of the axle bolt 8 and serving as a wedge surface inclined at an angle of approximately 8 degrees to the axis of the axle bolt 8 is thereby created. The wedge surface 28 lies approximately at the center of the axle bolt 8 and is a flat surface. Its dimensions are evident from the description of its function herein below.

At the center of the wedge surface 28, the axle bolt 8 contains a rectangular through-opening 29 which extends as far as into the cylindrical blind bore 19. On the diametrically opposed side, a further rectangular through-opening 31 with the same dimensions is in alignment with the rectangular through-opening 29.

Figure 2:
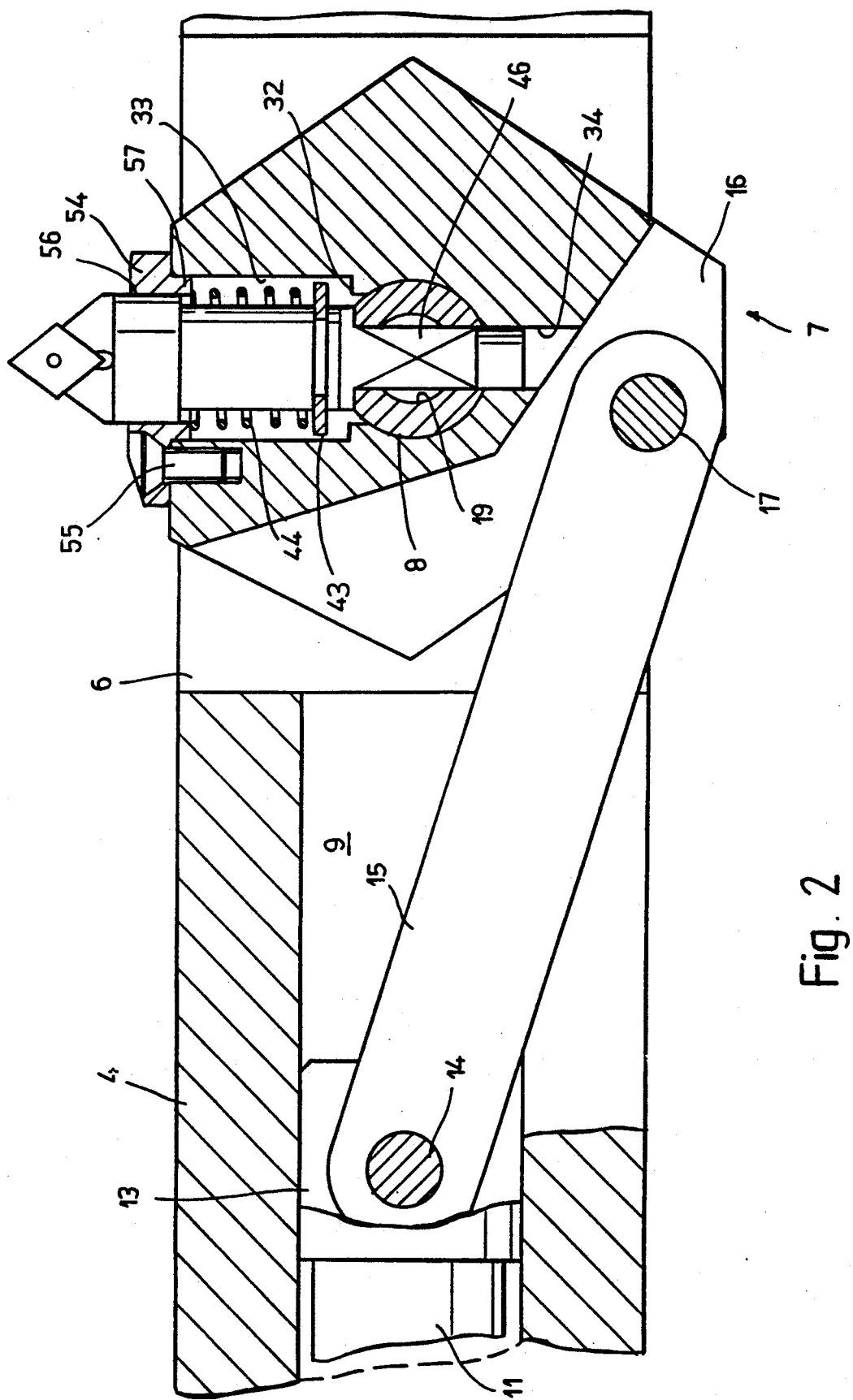
FIG. 2 is a longitudinal section of the device according to FIG. 1 taken along line II—II of FIG. 3.

Extending at a right angle to the axle bolt 8, the swivel housing 7 is provided with a stepped bore 32 which, with reference to the illustration in FIG. 2, has above the axle bolt 8 a cylindrical section 33 with a diameter larger than the outer diameter of the axle bolt 8 and below the axle bolt 8 a cylindrical section 34 with a diameter smaller than or equal to the transverse extend of the two four-edged openings 29 and 31, respectively. The axis of the stepped bore 32 intersects the axis of the axle bolt 8 at a right angle, i.e., the stepped bore 32 is in alignment with the two four-edged openings 29 and 31.

Seated for longitudinal displacement in the stepped bore 32 is a cutting tool holder 35 carrying at one of its ends in a corresponding receiving pocket a cutting insert 36 in the form of a rhombus plate. The cutting tool holder 35 consists of a cylindrical section 37 having formed on its one end face an attachment 38 having the shape of a halved frustum of a cone, with the surface 39 produced by the halving lying approximately on the axis of the cylindrical section 37. Machined in this surface and in the attachment 38, respectively, is the pocket for the rhombus-shaped cutting insert 36 which is attached with the aid of a clamping screw, not shown in detail. At the opposite end face, the cylindrical section 37 passes into a further cylindrical section 41 of smaller diameter which is coaxial with the section 37. At a point spaced from the section 37, the section 41 contains a circumferential annular groove 42 for a snap ring 43 seated therein (see FIG. 2) which acts as abutment for a compression spring 44 in the form of a helical spring.

With reference to the illustration in FIG. 5, after a short cylindrical piece below the annular groove 42, the section 41 passes into an approximately flat-edged shank part 45. The shank part 45 is delimited by two parallel surfaces 46 and 47 arranged diametrically relative to the longitudinal axis of the cutting tool holder 35 and extending to just under the annular groove 42. Extending between these two surfaces 46 and 47 are two further flat sides 48 and 49 likewise arranged diametrically relative to the longitudinal axis of the cutting tool holder 35 so the shank part 45 has, in all, a rectangular cross-section, with the spacing of the flat sides 48 and 49 corresponding to the width of the two openings 29 and 31 in the axle bolt 8, while the spacing of the narrow sides 46 and 47 is smaller than the length of the through-openings 29 and 31. The shank part 45 is, therefore, displaceable in the through-openings 29 and 31 parallel to the longitudinal axis of the axle bolt 8, but cannot tilt in the axle bolt 8 about the longitudinal axis of the axle bolt 8. In addition, owing to the shank part 45 of rectangular cross-section, the cutting tool holder 35 is secured against rotation relative to its longitudinal axis in order that the cutting surface of the cutting insert 36 will always point in the direction parallel to the axle bolt 8.

At the transition from the cylindrical section 41 to the shank part 45 there are two radially outwardly extending shoulders 51 and 52 which pass at their radially inner end into the flat sides 48, 49 and are delimited at their radially outer end by the cylinder surface of the cylindrical section 41. The two shoulders 51 and 52 lie in a common plane which is inclined relative to the longitudinal axis of the cutting tool holder 35 by the complementary angle which with the angle which the wedge surface 28 includes with the longitudinal axis of the axle bolt 8 makes up 90 degrees.

Finally, at the bottom end of the shank part 45 there is a cylindrical pin 53 which is concentric with the section 37 and the section 41, respectively, and matches with respect to its diameter the bores 34 in the swivel housing 7.

The cutting tool holder 35 of such design is inserted in the stepped bore 32 of the swivel housing 7, with its shank part 45 of rectangular cross-section being guided through the through-opening 29 and being inserted slightly further in the likewise rectangular opening 31. The cylindrical pin 53 leads out of the rectangular opening 31 of the axle bolt 8 and sits in a substantially play-free manner in the cylindrical bore 34.

In the assembled state, the two flat shoulders 51 and 52 rest with their entire surfaces on the flat wedge surface 28 and delimit further penetration of the cutting tool holder 35 into the swivel housing 7.

The cylindrical section 41 delimits together with section 33 of the stepped bore 32 a cylindrical annular space in which the compression spring 44 is arranged. At one end, the compression spring 44 rests on the snap ring 43. At the other end, the compression spring 44 is supported on cover 54 which is firmly screwed by attachment screws 55 to the swivel housing 7 beside the stepped bore 32. The cover 54 contains a cylindrical bore 56 in which the cylindrical section 37 of the cutting tool holder 35 is guided in a play-free manner. The cover 54 protrudes with a cylindrical collar 57 somewhat into the stepped bore 32, and the compression spring 44 is supported on the cylindrical collar 57.

The device 1 described hereinabove operates as follows: The cutting tool holder 35 is guided for longitudinal displacement in a play-free manner in the swivel housing 7, and the cutting forces occurring during the boring operation are transmitted, on the one hand, from the section 37 to the cover 54 which is supported in a positively connected manner in the stepped bore 32. Furthermore, the transverse forces are absorbed by the pin 53 which is likewise guided in a play-free manner in the cylindrical bore 34. Both cylindrical surfaces together, i.e., both that of section 37 and that of pin 53 also take over the tilting moment which occurs as a result of the cutting force.

The component of the cutting force acting in the longitudinal direction of the cutting tool holder 35 is transmitted via the shoulders 51 and 52 onto the wedge surface 28 of the axle bolt 8. The axle bolt 8 is mounted in a play-free manner in the main body 4 so the reaction force is introduced into the main body 4 and transmitted there onto the tool spindle and the pin 5, respectively.

In the absence of a cutting force, the two shoulders 51 and 52 are held with the aid of the compression spring 44 in abutment with the wedge surface 28.

Rotation of the cutting tool holder 35 as a result of the cutting forces acting at the cutting insert 36 is prevented by the shank part 45 of rectangular cross-section which is inserted in a rotationally fixed, but axially movable manner in the two rectangular openings 29 and 31 of the axle bolt 8. Moreover, the torques about the longitudinal axis of the cutting tool holder 35 are kept small by the active cutting edges of the cutter plate 36 lying as closely as possible to the longitudinal axis of the cutting tool holder 35 which is concentric with the sections 37 and 41 and runs through the point of intersection of the diagonals of the rectangular cross-section of the shank part 45.

Adjustment of the trajectory diameter is carried out as follows: Located in the bore 19 of the axle bolt 8 is a compression spring 58 which is supported at one end on the bottom 21 and rests with its other end on the narrow surface 47 of the shank part 45. The compression spring 58 attempts to pull the axle bolt 8 in the direction of the bottom 21 away from the cutting tool holder 35, the shank part 45 of which penetrates the bore 19. The two shoulders 51 and 52 thereby move along the wedge surface 28 to the lowest possible position in which they have the smallest radial spacing from the axis of the axle bolt 8 as the wedge surface 28 rises towards the compression spring.

Counteracting the compression spring 58 is the adjusting screw 23 which is screwed into the axle bolt 8 and rests with its flat end face 26 on the surface 46 of the shank part 45. Depending on how deeply the adjusting screw 23 is screwed into the axle bolt 8, the shank part 45 is displaced to a greater or lesser extent in the direction towards the compression spring 58, which moves the shoulders 51 and 52 on the wedge surface 28 surrounding the through-opening 29 radially outwardly relative to the axle bolt 8. When the adjusting screw 23 is adjusted, the shank part 45 moves in the radial direction through the axle bolt 8, and in each possible position, both in the proximity of the two shoulders 51 and 52 and in the proximity of the pin 53, the shank part 45 always remains at least to some extent in the rectangular openings 29 and 31.

However, since the cutting tool holder 35 is only longitudinally displaceable in the stepped bore 32, the relative movement between the cutting tool holder 35 and the axle bolt 8 can only come about by movement of the axle bolt 8, upon adjustment of the adjusting screw 23, back and forth in the longitudinal direction in the bores 10 and 18 which are in alignment with each other. The swivel housing 7 cannot follow this movement as it is guided in a play-free manner between the flat side walls of the receiving slot 6.

By screwing in the adjusting screw 23 more or less deeply, the axle bolt 8 can thus be displaced with respect to its longitudinal direction in the swivel housing 7, with it being displaced in the one direction as a result of the pressing force exerted by the adjusting screw 23 and in the other direction as a result of the force exerted by the compression spring 58. The longitudinal displacement of the axle bolt 8 allows the two shoulders 51 and 52 to slide along the wedge surface 28 and so the desired spacing of the cutting insert 36 from the axis of the axle bolt 8 can be adjusted.

As is evident, the cutting tool holder 35 is supported on all sides in a positively connected manner in the direction of the cutting pressure, more particularly, in the cover 54 and in the bore 34, on the one hand, and also with the aid of the shoulders 51 and 52 on the wedge surface 28, on the other hand. The purpose of the compression spring 44 is merely to hold the shoulders 51 and 52 in abutment with the wedge surface 28 in the absence of cutting pressure; it acts in the same direction as the cutting pressure.

When the position of the cutting insert 36 has been adjusted to the desired trajectory diameter by adjustment of the adjusting screw 23, the tool can be put into operation. For this purpose, the actuating rod 11 is brought into either the left or the right end position, whereby with the aid of the connecting rod 15, the swivel housing 7 is swiveled through 45 degrees either to the left or to the right, with reference to the position illustrated in FIG. 2, until the cutting insert 36 is pulled back behind the contours of the main body 4. The device 1 seated on the tool spindle can then be introduced into the workpiece to be machined until the pin 5 engages the corresponding abutment. The tool spindle with the device seated thereon is then set in rotational motion and by moving the actuating rod 11 from the one end position into the other possible end position, the swivel housing 7 is turned together with the axle bolt 8, and the radially outermost cutting corner of the cutting insert 36 moves along the arc of a circle 61. Adjustment of the cutter can be carried out both manually and automatically.

I claim:

1. A device (1) for boring spherically curved workpiece inner surfaces comprising a main body (4) having an axis of rotation (3), a swivel housing (7) mounted for swivel motion in said main body (4), an axle bolt (8) mounted in said main body (4), said axle bolt having a longitudinal axis extending along the length thereof, said longitudinal axis being at right angles to said axis of rotation (3); said axle bolt (8) extending through a bore in said main body and through said swivel housing (7) to mount said swivel housing (7) for swivel motion in said main body; an arrangement of rods (11, 15) forming a linkage driving said swivel housing in said main body (4); a cutting tool holder (35) carried by said swivel housing (7) having a longitudinal axis extending radially into said axle bolt, said cutting tool holder (35) being radially adjustable relative to said axle bolt (8); bias means urging said cutting tool holder in a direction towards said axle bolt (8); a wedge surface (28) on said axle bolt cooperating with a wedge surface on said cutting tool holder (35) for radial adjustment of said cutting tool holder (35) by said member relative to said axle bolt (8) against said bias means, and an actuating means (23) for adjusting said wedge surface, comprising means mounting said axle bolt (8) for displacement in said main body (4) along said longitudinal axis thereof in said swivel housing (7), said axle bolt (8) rotationally fixedly mounted in said swivel housing (7).

2. A device as defined in claim 1, wherein said axle bolt (8) includes a longitudinal bore to be of tubular configuration, said tool holder includes a portion extending transversely through said axle bolt, and in that said actuating means (23) for displacing said axle bolt (8) includes an element threaded into said longitudinal bore and engaged with said portion of said tool holder.

3. A device as defined in claim 1, wherein said portion of said cutting tool holder (35) positions said axle bolt (8) in a rotationally fixed manner in said swivel housing (7).

4. A device as defined in claim 1, wherein said axle bolt (8) contains a transverse through-opening (29, 31) which intersects said longitudinal axis of said axle bolt (8) and emerges at diametrically opposed points of said axle bolt (8), said portion of said tool holder passing through said transverse through opening.

5. A device as defined in claim 4, wherein said through-opening (29) extends through said wedge surface (28).

6. A device as defined in claim 1, wherein said wedge surface (28) is arranged approximately at the center of said axle bolt (8).

7. A device as defined in claim 1, wherein a plane defined by said wedge surface (28) intersects said longitudinal axis of said axle bolt (8).

8. A device as defined in claim 1, wherein said swivel housing (7) contains a bore (32) in which said cutting tool holder (35) is arranged for longitudinal displacement.

9. A device as defined in claim 8, wherein said bore (32) for said cutting tool holder (35) intersects said bore (10) for said axle bolt (8).

10. A device as defined in claim 1, wherein said portion of said cutting tool holder (35) comprises a shank part (45) which extends through said through-opening (29, 31) of said axle bolt (8), said wedge surface on said tool holder adjacent to said shank part.

11. A device as defined in claim 10, wherein said shank part (45) has flat sides extending parallel to the longitudinal axis of said axle bolt, and in that said through-opening (29, 31) in said axle bolt (8) is an elongate hole having flat sides fit to said shank part flat sides.

12. A device as defined in claim 10, wherein the length of said shank part (45), measured in the longitudinal direction of said cutting tool holder (35), is less than the outer diameter of said axle bolt (8).

13. A device as defined in claim 10, wherein said shank part (45) of said cutting tool holder (35) has an end remote from said cutting tool (36), a pin (53), extending from said end which is smaller than the cross-section of said shank part (45) and is guided in a corresponding opening (34) of said swivel housing (7) on a side of said axle bolt (8) opposite said cutting tool (36).

14. A device as defined in claim 13, wherein said pin (53) is a cylindrical pin and said associated opening (34) in said swivel housing (7) is a cylindrical bore.

15. A device as defined in claim 10, wherein said cutting tool holder (35) has a shoulder defining said tool holder wedge surface (28), said cutting tool (36) also having a cylindrical transverse section (41) adjacent said wedge surface, the cross-sectional area of said cylindrical section equal to or greater than the transverse area of said shank part (45).

16. A device as defined in claim 15, wherein said tool holder is formed with cylindrical section (41), a collar (37) of further enlarged cross-section adjacent to said cylindrical section.

17. A device as defined in claim 15, further including a compression spring (44) engaged at one end on said swivel housing (7) and at the other and engaging said cutting tool holder (35), said compression spring comprising said bias means urging said tool holder in the direction towards said wedge surface (28) of said axle bolt (8).

18. A device as defined in claim 17, wherein said compression spring is a helical spring (44).

19. A device as defined in claim 17, wherein said swivel housing (7) includes a cover (54), said cover having an opening (56) for passage of said cutting tool holder (35) therethrough, said cover engaged by said one end of said compression spring (44), and in that said cover is formed with an opening receiving said cutting tool holder (35) to be guided therein.

20. A device as defined in claim 2, wherein said tubular axle bolt (8) is closed at one end, and said actuating means includes a compression spring (58) and an actuating screw (23) comprising said element, in that said compression spring (58) is arranged between said closed end of said axle bolt (8) and said cutting tool holder (35), and in that said actuating screw (23) is screwed into an internal thread (22) on said axle bolt (8) at the opposite end of said spring (58) which is supported on said cutting tool holder (35) in such a way that when said screw (23) is screwed in, said cutting tool holder (35) is displaced radially relative to said axle bolt (8) in the direction of said cutting tool (36) by said wedge surfaces.

21. A device as defined in claim 1, further including a cutting tool (36) mounted in said tool holder, said cutting tool having a cutting edge which is aligned with said longitudinal axis of said cutting tool holder (35).

* * * * *